United States Patent Office 3,239,567
Patented Mar. 8, 1966

3,239,567
POLYMERIZATION OF ALKYLENE OXIDES WITH A CATALYST COMPOSED OF ALUMINUM HYDRIDE AND A METAL HALIDE
Herbert C. Kaufman, New Haven, Conn., assignor to Olin Mathieson Chemical Corporation, a corporation of Virginia
No Drawing. Filed Oct. 22, 1962, Ser. No. 232,258
8 Claims. (Cl. 260—615)

This invention relates to an improved process for the polymerization of alkylene oxides and compositions produced thereby. More particularly, this invention relates to the use of novel catalysts in processes for the polymerization of alkylene oxides, and compositions produced thereby.

Polymerization of olefin oxides in the presence of a catalyst has been carried out commercially for several years. Recently polymers have been prepared by the use of a "ferric chloride complex of propylene oxide" which provides catalytic action. This complex must be prepared in a separate reaction with extreme care and stored under vacuum prior to use. This catalyst and other previously available catalysts have certain inherent disadvantages with respect to either preparation at a desired reproducible activity, or in being difficult to remove from the polymer, or in other properties.

It is a primary object of this invention to provide an improved process for polymerization of alkylene oxides.

Another object of this invention is to provide a novel catalyst capable of promoting the desired polymerization of alkylene oxides.

Still another object of this invention is to provide novel olefin polymers.

These and other objects of this invention will be apparent from the following detail description thereof.

It has now been discovered that the polymerization or co-polymerization of alkylene oxides is effectively promoted by incorporating in the reaction mixture a catalytic proportion of a mixture of aluminum hydride and a metal halide. In addition, novel olefin polymers have also been discovered.

Aluminum hydride used as a component of the mixture of catalysts in the instant invention is preferably of the non-solvated type which may be prepared by reacting an ether solution of aluminum chloride with lithium aluminum hydride, which yields a solution of aluminum hydride. This solution is contacted with an inert liquid such as pentane, which causes precipitation of solid aluminum hydride. The procedure for preparing aluminum hydride is set forth in technical report to the Office of Naval Research, Contract OMR–494 (04), by M. John Rice, Jr., with the assistance of George Chizinsky, Department of Chemistry, Tufts University, Medford 55, Massachusetts, August 1, 1956. The "Journal of the Americal Chemical Society," volume 77 (1955), pages 3164–3165, also discloses a technique for preparing aluminum hydride.

Metal halides suitable for use as a component of the catalytic mixture of this invention include ferric chloride, nickel bromide, stannic chloride, beryllium chloride, zirconium chloride, cobalt chloride, arsenous chloride, titanium tetrachloride, etc. and mixtures thereof. The metal halides may be employed with or without water of crystallization. For example, anhydrous ferric chloride and ferric chloride hexahydrate are both satisfactory. In addition metal complexes of acetylacetonates such as zirconium acetylacetonate are also effective. The catalyst mixture of this invention contains aluminum hydride and metal halide in a weight ratio of between about 3:1 and about 1:9, and preferably between about 1:1 and about 1:4.

The proportion of catalyst mixture added to the alkylene oxide to effect polymerization is generally between about 0.1 and about 2.5 percent by weight of the alkylene oxide, and preferably between about 0.3 and about 1.4 percent by weight of the alkylene oxide. However any proportion of catalyst mixture having a catalytic effect upon the polymerization may be employed. When a mixture is added in a proportion above about 2.5 percent by weight of the alkylene oxide, generally there is little or no improvement in the degree of polymerization, and the proportion above about 2.5 percent merely acts as a diluent.

Alkylene oxides, or epoxides, which may readily be polymerized by the catalyst mixture of this invention include ethylene oxide, propylene oxide, butylene oxide, halogenated alkylene oxides such as 4,4,4-trichlorobutylene oxide-1,2, and aryl substituted alkylene oxides such as styrene oxide, and mixtures thereof. Such alkylene oxides may be polymerized, or mixtures thereof copolymerized, to stereospecific long-chain compounds characterized by high molecular weight, from between about 1,000 to about 100,000, as indicated by light scattering measurements.

Polymerization of the alkylene oxides is effected in the absence of a solvent or diluent, but better control of temperature and the rate of reaction, and greater uniformity of product result when an inert solvent or diluent, such as an aliphatic hydrocarbon is used. The polymerization reaction is carried out generally within the temperature range between about 50° C. and about 250° C. for a period of between about one and 24 hours. However it is preferred to employ a reaction temperature between about 110° C. and about 180° C. for at least about 12 hours.

Alkylene oxide polymers produced in accordance with the technique of this invention are oils, greases, gels and/or rubbers, the utility of which is well known in the art.

The following examples are presented to define the invention more fully without any intention of being limited thereby. All parts and percentages are by weight unless otherwise specified.

*Example I*

To a stainless steel rocking autoclave flushed with nitrogen, 1 part of aluminum hydride, 600 parts of propylene oxide (commercial grade), and 3 parts of $FeCl_3 \cdot 6H_2O$ were added in that order. The temperature was increased to about 135° C. over a period of about 4 hours and held at that temperature for another 12 hours. The maximum pressure obtained during this period was about 190 p.s.i.g. At the end of this period, the autoclave was cooled, and the contents were washed with benzene, and with a 10 percent aqueous solution of hydrochloric acid, and twice more with water to effectively destroy the aluminum hydride and render the ferric chloride into the aqueous portion. Upon drying the benzene fraction and separating benzene therefrom, 450 parts of a firm yellow-orange grease resulted. About 15 percent of the greased product had an average molecular weight of about 21,500 as determined by light scattering measurements, and about 85 percent of the grease product had an average molecular weight of about 1,100 as determined by an osmometer. The aqueous extract, after filtering, was evaporated to yield 50 parts of a viscous yellow oil.

*Example II*

The procedure of Example I was repeated with the exceptions that the temperature was maintained at 175° C. during the reaction period, and the maximum pressure developed was about 350 p.s.i.g. The product obtained by this technique was 400 parts of a rubbery solid.

Example III

The procedure of Example I was repeated with the exception that the ferric chloride hexahydrate was replaced with zinc chloride. The product was 400 parts of a colorless, sticky resin.

Example IV

The procedure of Example I was repeated with the exception that the ferric chloride hexahydrate was replaced with zirconium bromide. The product was 400 parts of a colorless rubber.

Example V

The grease obtained from Example I was tested for lubricity and wear in both a Falex and Timkin Bearing Tester. The results indicated seizure at 550 pounds and 25 pounds load, respectively. These values were better by a factor of 2 over ordinary petroleum or glycol-based greases. This grease was lubricious at temperatures as low as −95° F., with no crystallization or coalescence, and was thermally stable up to a temperature of about 400° F., without the use of any additives. Lubricity of the grease is further improved by 25 percent upon catalytic hydrogenation. These tests demonstrated the excellent lubricity and low wear properties of the grease.

Example VI

The procedure of Example I was repeated with the exception that anhydrous ferric chloride was employed as the metal halide. A grease similar to that of Example I was obtained.

Example VII

The procedure of Example I was repeated with the exception that 600 parts of 4,4,4,-trichlorobutylene oxide-1,2 was employed instead of the propylene oxide. The temperature of the reaction was maintained at about 135° C. for about 24 hours. The maximum pressure obtained during this period was about 200 p.s.i.g. About 450 parts of a resinous product was obtained.

Example VIII

The procedure of Example I was repeated with the exception that 600 parts of butylene oxide was employed instead of propylene oxide. The temperature was maintained at about 135° C. for a period of about 24 hours. The maximum pressure obtained during this period was about 60 p.s.i.g. About 200 parts of an oil was obtained as a product.

Example IX

The procedure of Example VIII was repeated with the exception that 3 parts of ferric chloride hexahydrate was replaced with 3 parts of zinc chloride. The product was about 200 parts of an oil.

For purposes of comparison, when only aluminum hydride was used as the catalyst there was substantially no polymerization of the alkylene oxide and when only a metal halide was employed as a catalyst, polymer yield was extremely low. Various modifications of the invention, some of which have been referred to above, may be employed without departing from the scope of this invention. Therefore I do not wish to be limited except as defined by the following claims.

I claim:

1. In the process for polymerizing an alkylene oxide to a polymer having a molecular weight in the range between about 1,000 and about 100,000 by heating said alkylene oxide in the presence of a catalyst at a temperature in the range between about 50° C. and about 250° C., wherein the said alkylene oxide is selected from the group consisting of ethylene oxide, propylene oxide, butylene oxide, 4,4,4-trichlorobutylene oxide-1,2, styrene oxide, and mixtures thereof, the improvement which comprises employing as a catalyst a catalytic proportion of a mixture of aluminum hydride and a metal halide, said metal halide being selected from the group consisting of anhydrous ferric chloride, ferric chloride hexahydrate, nickel bromide, stannic chloride, beryllium chloride, zirconium chloride, zirconium bromide, zinc chloride, cobalt chloride, arsenous chloride, titanium tetrachloride, and mixtures thereof, the weight ratio of aluminum hydride to said metal halide being between about 3:1 and about 1:9.

2. The process of claim 1 wherein the catalytic proportion of the mixture is between about 0.1 and 2.5 percent by weight of said alkylene oxide.

3. The process of claim 1 wherein the catalytic proportion of said mixture is between about 0.1 and 2.5 percent by weight of said alkylene oxide, and the weight ratio of aluminum hydride to said metal halide is between about 1:1 and about 1:4.

4. The process of claim 2 wherein said heating is effected at a temperature in the range of between about 50° C. and about 250° C. for a period of between about one and about twenty-four hours.

5. In the process of polymerizing propylene oxide to a polymer having a molecular weight in the range between about 1,000 and about 100,000 by heating propylene oxide in the presence of a catalyst at a temperature in the range between about 50° C and about 250° C., the improvement which comprises employing as a catalyst a catalytic proportion of a mixture of aluminum hydride and ferric chloride, the weight ratio of aluminum hydride to ferric chloride being between about 3:1 and about 1:9.

6. In the process of polymerizing propylene oxide to a polymer having a molecular weight in the range between about 1,000 and about 100,000 by heating propylene oxide in the presence of a catalyst at a temperature in the range between about 50° C. and about 250° C., the improvement of which comprises employing as a catalyst a catalytic proportion of a mixture of aluminum hydride and zinc chloride, the weight ratio of aluminum hydride to zinc chloride being between about 3:1 and about 1:9.

7. In the process for polymerizing propylene oxide to a polymer having a molecular weight in the range between about 1,000 and about 100,000 by heating propylene oxide in the presence of a catalyst at a temperature in the range between about 50° C. and about 250° C., the improvement of which comprises employing as a catalyst a catalytic proportion of a mixture of aluminum hydride and zirconium bromide, the weight ratio of aluminum hydride to zirconium bromide being between about 3:1 and about 1:9.

8. In the process of polymerizing 4,4,4-trichlorobutylene oxide -1,2 to a polymer having a molecular weight in the range between about 1,000 and about 100,000 by heating 4,4,4-trichloro-oxide-1,2 in the presence of a catalyst at a temperature in the range between about 50° C. and about 250° C., the improvement of which comprises employing at a catalyst catalytic proportion of a mixture of aluminum hydride and ferric chloride, the weight ratio of aluminum hydride to ferric chloride being between about 3:1 and about 1:9.

References Cited by the Examiner

UNITED STATES PATENTS

| | | | |
|---|---|---|---|
| 2,876,209 | 3/1959 | Naps | 260—47 |
| 2,895,931 | 7/1959 | Klug | 260—20 X |
| 2,962,491 | 11/1960 | Mertzweiller | 260—94.9 |

FOREIGN PATENTS 828,973   2/1960   Great Britain.

OTHER REFERENCES

Kambara et al.: J. Polymer Sci., 27, 584–586 (1958).
Colclough et al.: J. Polymer Sci., 34, 171–179 (1959).

WILLIAM H. SHORT, *Primary Examiner.*